United States Patent [19]

Deverell et al.

[11] 4,129,469
[45] Dec. 12, 1978

[54] SPLICING PROCESS AND APPARATUS

[75] Inventors: Christopher Deverell, Rosenberg, Netherlands; Ronald W. Wells, Welwyn Garden City, England

[73] Assignee: Imperial Chemical Industries Limited, London, England

[21] Appl. No.: 815,027

[22] Filed: Jul. 12, 1977

[30] Foreign Application Priority Data

Aug. 12, 1976 [GB] United Kingdom ............... 33603/76

[51] Int. Cl.$^2$ ..................... B31F 5/00; B65H 17/28; B65H 19/18
[52] U.S. Cl. .................................. 156/157; 156/272; 156/504; 226/91; 226/94; 242/58.1
[58] Field of Search ............... 156/157, 159, 272, 502, 156/504; 242/58.1; 226/94, 91

[56] References Cited

U.S. PATENT DOCUMENTS

| | | | |
|---|---|---|---|
| 3,054,708 | 9/1962 | Steinberg | 156/272 |
| 3,892,614 | 7/1975 | Levy | 156/272 |
| 4,038,121 | 7/1977 | Benson | 156/157 |

Primary Examiner—Douglas J. Drummond
Attorney, Agent, or Firm—Cushman, Darby & Cushman

[57] ABSTRACT

Webs such as thermoplastics films are spliced together by electrostatic charges while moving at equal speeds. Particularly useful in the production of thermoplastics such as polyethylene terephthalate films and in a preferred embodiment facilitates the threading of the film after a malfunction, e.g., splitting in the stenter. The production web is fed to a dump while splicing and rethreading is effected by feeding a leader web through a subsequent stage of the apparatus, e.g., to a wind-up device. The leader web is fed into the wind-up at the same speed as the production web passing to dump and the webs are spliced together by electrostatic charges. The web passing to dump and the feed of the leader web are severed in that order.

9 Claims, 1 Drawing Figure

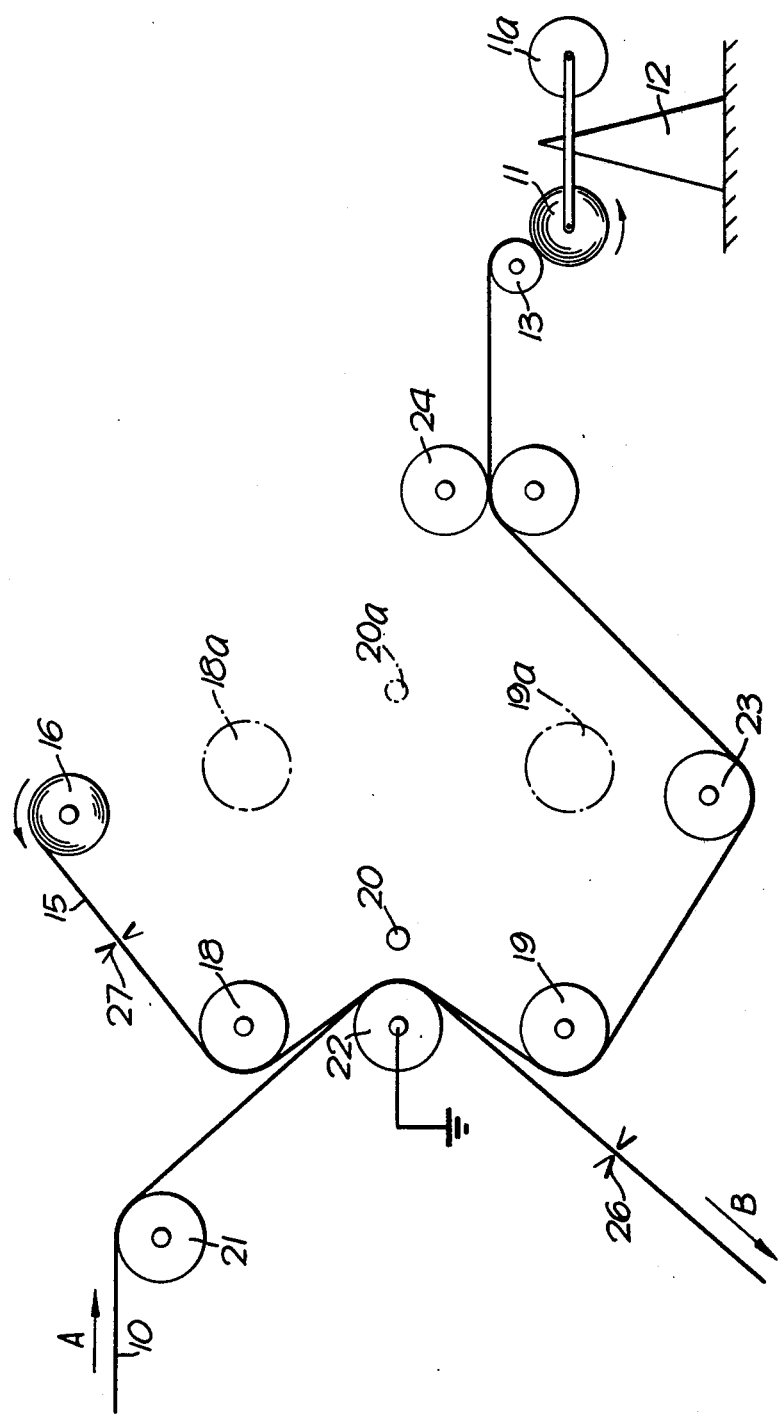

SPLICING PROCESS AND APPARATUS

The present invention relates to a process and apparatus for splicing together two moving webs, such as thermoplastics films.

U.S. Pat. No. 4,038,121 describes a process of splicing a thermoplastic film to a leader web to facilitate the threading of the film from a formation section to a wind-up section in a film-producing apparatus. Splicing is effected by means of an adhesive or by needle punching.

According to the present invention a process for splicing two moving webs together comprises transporting the two webs at substantially equal linear speeds, bringing the moving webs into surface-to-surface contact, the webs being transported in substantially the same direction of movement at least in the region of surface-to-surface contact, and depositing electrostatic charges upon one or both of the moving webs such that the webs adhere to each other electrostatically.

According to a further aspect of the present invention, an apparatus for splicing two moving webs together comprises means for transporting the moving webs at substantially equal linear speeds, guide means arranged to bring the moving webs into surface-to-surface contact and transport the webs in substantially the same direction of movement at least in the region of surface-to-surface contact, and at least one electrode connected to a high voltage source and arranged to deposit electrostatic charges upon one or both of the moving webs such that the webs adhere electrostatically to each other.

The present invention may be employed in the production of thermoplastics films and is particularly suitable for threading a flat film from one stage in the process for its production through a subsequent stage without interrupting the continuity of earlier stage in the film-making process. If, for example, a malfunction such as film splitting were to occur in the earlier stage of the process such that the film were not suitable for supply to the subsequent stage, it is possible according to this invention to transport the film output of the earlier stage to a dump location whilst a leader web is fed through the subsequent stage, generally by a manual operation, and raised to a linear speed substantially equal to that of the film in the earlier stage. The film moving to dump and the leader web are then spliced together by the procedure according to the invention. Once splicing has been accomplished, the film issuing from the earlier stage is severed from that which has passed to dump so that it is carried by the splice along the path of the leader web in the subsequent stage. When the passage of the film from the earlier stage to and through the subsequent stage has been established, the leader web is severed from its supply which may comprise a roll of a thermoplastics film.

Accordingly, in a preferred embodiment of the invention, a threading operation in a process for the production of a web, such as a thermoplastics film, comprises in sequence feeding the production web of an earlier stage in the process to a dump location whilst threading a leader web through a subsequent stage in the process, transporting the threaded leader web at a linear speed substantially equal to that of the production web, bringing the moving webs into surface-to-surface contact, the webs being transported in substantially the same direction of movement at least in the region of surface-to-surface contact, depositing electrostatic charges upon one or both of the moving webs such that the webs adhere to each other electrostatically and severing the production web from that which has passed to the dump location.

In another preferred embodiment of the invention, an apparatus for the production of a web, such as a thermoplastics film, comprises means for feeding the production web of an earlier stage in the web production to a dump location and means for supplying a leader web to a subsequent stage in the web production, means for transporting the leader web through the subsequent stage at a linear speed substantially equal to that of the production web, means arranged to bring the moving webs into surface-to-surface contact and transport the webs in substantially the same direction of movement at least in the region of surface-to-surface contact, and at least one electrode connected to a high voltage source and arranged to deposit electrostatic charges upon one or both of the moving webs such that the webs adhere electrostatically to each other, and means for severing the production web from that which has passed to the dump.

Preferably the leader web is severed from its supply after the production web has been separated from that which has passed to the dump location. The leader web need not have the same width as the production web and may be narrower if desired.

The dump location may comprise a receptacle into which the production web is fed whilst the threading operation is in progress. Generally it is desirable to dice the film fed to dump and to recycle it through the film production apparatus.

It is believed that the splicing effect according to the present invention is achieved by the following mechanism although the applicants do not wish to be bound by any theoretical explanation. In a typical system in which the webs are united and passed over a backing roller for splicing, electrostatic charges deposited upon the surface of the upper web raise the electrostatic potential of the surface to a predetermined value in relation to the corona discharge threshold voltage of the electrode assembly. During the separation of the web composite from the backing roller an electrostatic discharge occurs between the lower web and the roller surface thereby depositing a complementary electrostatic charge upon the lower web of opposite polarity to that upon the upper web. The Coulombic attraction between the opposite charges forces the webs together and providing there is a sufficient overlap of the webs, the resulting splice is strong enough to facilitate the transport of the production web together with the leader web. However, the Coulombic attraction between the webs functions to exclude air from between the webs and the forces between the webs which result in splicing may be wholly or partly attributable to atmospheric pressure forces.

The electrostatic charges may be deposited upon the webs by supporting the webs upon a backing roller comprising the guide means for bringing the webs into surface-to-surface contact and applying the charges from an electrode located on the side of the contacting webs which is remote from the backing roller. The conditions for applying the electrostatic charges are in general similar to those which are known and used for the casting and quenching of polyethylene terephthalate films. A useful method of operation is to electrically earth the backing roller and to apply a high voltage potential to the electrode. The potential applied to the electrode may be of direct or alternating current.

The electrode may conveniently comprise one or more small diameter metal wires, e.g., of diameter up to 0.08 inch and preferably in the range 0.003 to 0.01 inch, extending across the path of the webs. Alternatively, the electrode may comprise an assembly of sharp needle points arranged across the path of the webs. The electrode is desirably located above the upper web in the vicinity of the line of first contact between the two webs. The spacing between the electrode and the upper web may vary between 0.1 and 2.0 inches and preferably does not exceed 1.0 inch, a spacing of about 0.4 inch providing adequate splicing.

The splice achieved by the present invention has a weak peel strength combined with adequate strength along the plane of the webs such that a splice having sufficient strength to facilitate the threading of the production web by the leader web can be produced. Since the splice has a weak peel strength it is possible to establish the splicing conditions and in particular to deposit electrostatic charges upon the web whilst the production web continues to pass to the dump location and the leader passes through the subsequent stage by directing the webs along divergent paths such that their divergence causes the webs to peel apart thus enabling them to traverse their desired independent paths.

It has been found that the deposition of too great a charge density increases the peel strength of the splice and hence impedes peeling the webs apart with a risk that the webs may not pass efficiently along their intended respective paths prior to the severing operations. On the other hand, too small a charge density may result in an inadequate strength along the plane of the webs such that the splice has inadequate strength to feed the production web through the subsequent stage. The optimum conditions for depositing charges upon the webs may be determined by simple experimentation. Electrical losses to the apparatus may vary according to the nature of the apparatus and will influence the potential and current which must be applied to the electrode to achieve a satisfactory splice. Furthermore, higher web speeds generally require larger surface charge densities to achieve satisfactory splicing.

Satisfactory splicing may be achieved using, for example, wire electrodes of the diameter and spacing from the upper web specified above, by means of a direct current electrical potential in the range 1 to 20 kilovolts, and preferably in the range 8 to 13 kilovolts, with an applied current in the range 0.04 to 0.30 milliamperes.

A static charge eliminator may be located downstream of the electrode to obviate the webs being wrapped around any transporting rollers in the apparatus and may conveniently be located immediately after the backing roller and on the same side of the spliced webs as the lower web, i.e., the web which passes over the surface of the backing roller.

The splicing operation according to the present invention is particularly suitable for feeding a thermoplastics film, such as a molecularly oriented and heat-set polyethylene terephthalate film, from the heat setting operation which is normally effected in a stenter apparatus to a wind-up device in which the film is wound onto mill rolls.

The FIGURE is a sideways schematic view of an apparatus according to one embodiment of the invention.

The drawing illustrates a production web 10 in the form of a polyethylene terephthalate film which has been molecularly oriented by stretching in sequence in its longitudinal and transverse directions and heat set by conventional means. The production web 10 enters the apparatus in the direction of the arrow A from a conventional heat-setting stenter (not illustrated in the drawing) and is transported through the illustrated apparatus when running under normal operation to be wound upon a mill roll 11 of a wind-up turret 12 with the assitance of a lay-on roll 13.

In the event of a malfunction such as splitting in the film which may occur during an earlier stage of the film-making process, e.g., during transverse stretching or heat setting, a leader web 15, also comrising an oriented and heat-set polyethylene terephthalate film, is drawn from a supply roll 16 and spliced to the production web to facilitate rethreading through the subsequent stage of the process which terminates at the wind-up turret 12. Splicing is facilitated by means of a pair of laterally movable rollers 18 and 19 and a laterally movable wire electrode 20, all of which are shown in continuous lines in the drawing in the splicing position. For normal operation, the rollers 18 and 19 and the electrode 20 are moved to the position shown in dotted lines 18a, 19a and 20a respectively. The wire electrode 20 is supported in tension and the ends of the electrode projecting beyond the edges of the webs are electrically insulated with tubular polytetrafluoroethylene sleeves to prevent electrical sparking to the backing roller 22.

During normal operation, the production web 10 follows the path defined by a guide roll 21, an electrically earthed backing roller 22, a guide roll 23 (traversing a direct path between the backing roller 22 and the guide roll 23) and a pair of driving nip rolls 24.

When a malfunction occurs necessitating rethreading of the web 10 to the wind-up turret 12, the web 10 is fed from the backing roller 22 in the direction of the arrow B to a dump location (not illustrated in the drawing) which comprises a receptacle for the web from which the film is ultimately diced and recycled through the film production apparatus. The web 10 continues to feed to dump until splicing and rethreading to the mill roll 11 has been achieved. With the movable rollers 18 and 19 and the electrode 20 retracted into the positions 18a, 19a and 20a, the leader web 15 is drawn from the supply roll 16 and threaded manually around the guide roll 23, between the nip rolls 24 and around the lay-on rolls 13 onto the mill roll 11. The wind-up system is then put into motion so that the linear speed of the leader web 15 passing from the supply roll 16 to the mill roll 11 equals the linear speed of the production web 10 which passes to the dump.

The laterally movable rollers 18 and 19 and the electrode 20 are then traversed into the position illustrated in continuous lines in the drawing so that the rollers 18 and 19 press the leader web 15 into contact with the production web 10 against the backing roller 22. The electrode 20 when energized by connection to a high potential direct current source of electricity deposits electrostatic charges upon the leader web 15 thereby electrostatically adhering it to the production web 10. On account of the weak peel strength of the electrostatic bond, the webs are readily peeled apart and continue along their respective paths to the dump and to the mill roll 11 until the production web 10 is severed from the web which has passed to dump by means of cutting knives 26. The production web 10 is then carried with the leader web 15 by virtue of the electrostatic splice to the leader web 15 on to the mill roll 11. After satisfactory winding of the production web 10 onto the mill roll has been established, the leader web 15 is severed from the supply roll 16 by means of the cutting knives 27. The laterally movable rollers 18 and 19 and the electrode 20 are then traversed to the positions 18a, 19a and 20a. Finally, a fresh mill roll 11a is substituted for the roll 11 so that the production web is wound onto the roll 11a.

If desired, a static charge eliminator may be employed, e.g., located between the backing roller 22 and the laterally movable roller 19 and on the same side of the webs as the backing roller 22.

The invention is further illustrated by the following examples.

EXAMPLE 1

Using apparatus similar to that illustrated in the drawing, a biaxially oriented and heat-set polyethylene terephthalate film production web 10 of thickness 23 μm was spliced to a biaxially oriented and heat-set polyethylene terephthalate film leader web 15 of thickness 12 μm and threaded to the mill roll 11.

The backing roll 22 had a chromium-plated surface and a diameter of about 3 inches. The electrode 20 was a stainless steel wire of diameter 0.005 inch located 0.4 inch from the surface of the backing roll 22.

Using the sequence of operations described above with reference to the drawing, splicing was achieved by applying a potential of 10 kv and a current of 0.06 milliamperes to the electrode 20. Satisfactory splicing and threading of the production web 10 onto the mill roll 11 was achieved at a linear web speed of 600 feet/minute with a tension of about 0.4 lbs/sq inch in each web. The results are shown in the following table.

EXAMPLES 2, 3 AND 4

Polyethylene terepthalate films were spliced together by the procedure described in Example 1 using the same apparatus and with the modified conditions given in the following table. Satisfactory splicing and threading of the production web were achieved.

TABLE

| Example | Film thickness (μm) Production web | Film thickness (μm) Leader web | Electrode potential (kV) | Film speed ft/min | Current in electrode (mA) |
|---|---|---|---|---|---|
| 1 | 23 | 12 | 10 | 600 | 0.06 |
| 2 | 23 | 12 | 11.5 | 1000 | 0.24 |
| 3 | 23 | 12 | 10 | 1000 | 0.09 |
| 4 | 12 | 12 | 10 | 1000 | 0.12 |

We claim:

1. A threading operation in a process for the production of a web, said operation comprising the steps of sequentially feeding a production web to a dump location while threading a leader web through a subsequent stage in the process, transporting the threaded leader web at a linear speed substantially equal to that of the production web, electrostatically splicing the production and leader webs together by bringing the moving webs into surface-to-surface contact, the webs being transported in substantially the same direction of movement in the region of surface-to-surface contact, and depositing electrostatic charges on at least one of the moving webs so that the webs adhere electrostatically, and then severing the production web from that which has passed to the dump location, so that the conditions for splicing are established in advance of the instant when splicing must occur.

2. A threading operation according to claim 1, in which the webs are brought into surface-to-surface contact by passage over a backing roller and the electrostatic charges are deposited upon one or both of the webs from an electrode located on the side of the contacting webs remote from the backing roller.

3. A threading operation according to claim 2, in which the backing roller is electrically earthed and a high voltage potential is applied to electrode.

4. A threading operation according to claim 2, in which the electrode is maintained at a direct current electrical potential in the range 1 to 20 kilovolts and a current in the range of 0.04 to 0.30 milliamperes.

5. Apparatus for threading a web, said apparatus comprising means for feeding a production web to a dump location, means for supplying a leader web to a subsequent stage at a linear speed substantially equal to that of the production web, guide means for bringing the moving webs into surface-to-surface contact and for transporting them in substantially the same direction in the region of surface-to-surface contact, at least one electrode connected to a high voltage source and positioned to deposit electrostatic charges upon at least one of the moving webs so that the webs adhere electrostatically to each other, and means for severing the production web from that which is passed to the dump location after said electrode has established an electrostatic charge, so that the conditions for splicing are established in advance of the instance when splicing must occur.

6. A threading operation according to claim 5, in which the leader web is severed from its supply after the production web has been severed from that which has passed to the dump location.

7. An apparatus according to claim 5, in which the guide means for bringing the webs into surface-to-surface contact comprise a backing roller and the electrode is located on the side of the contacting webs remote from the backing roller.

8. An apparatus according to claim 7, in which the backing roller is electrically earthed and the electrode is connected to a source of high voltage potential.

9. An apparatus according to claim 5, which includes means for severing the leader web from its supply after the production web has been severed from that which has passed to the dump location.